Figure 1:
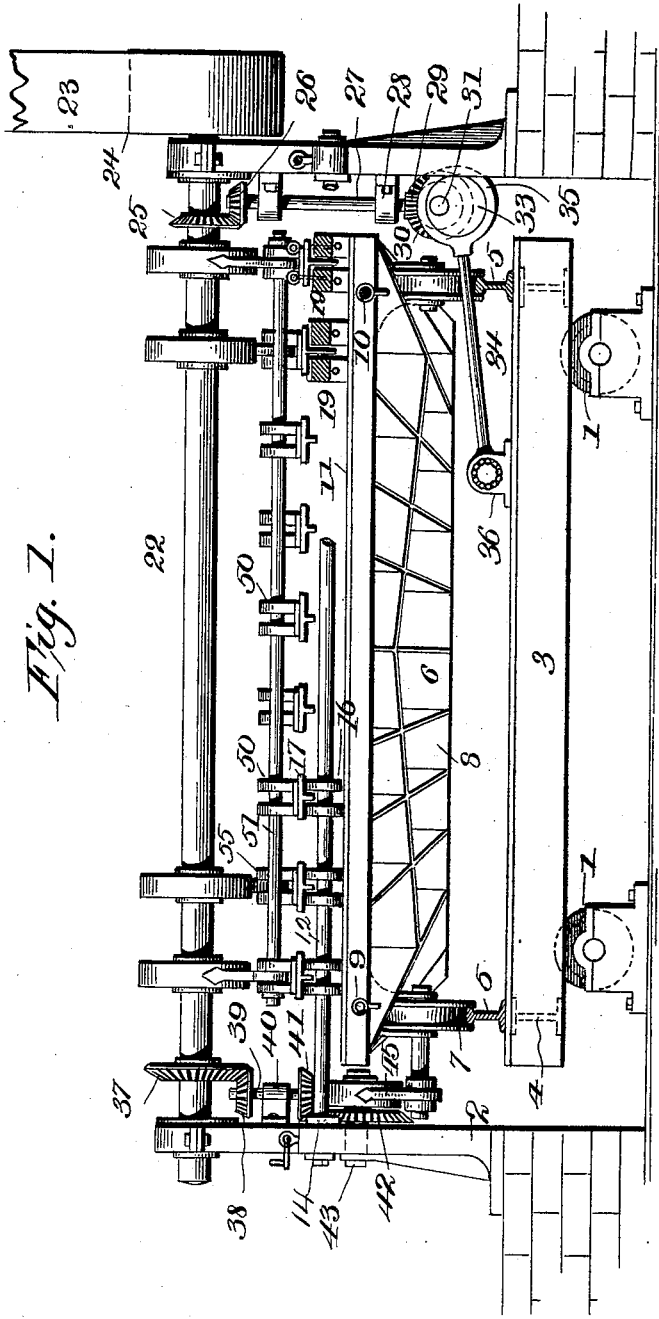

No. 613,532. Patented Nov. 1, 1898.
P. SEMMER.
GLASS POLISHING MACHINE.
(Application filed Nov. 19, 1897.)
(No Model.) 3 Sheets—Sheet 1.

Witnesses
Inventor
Phillip Semmer
Attorneys

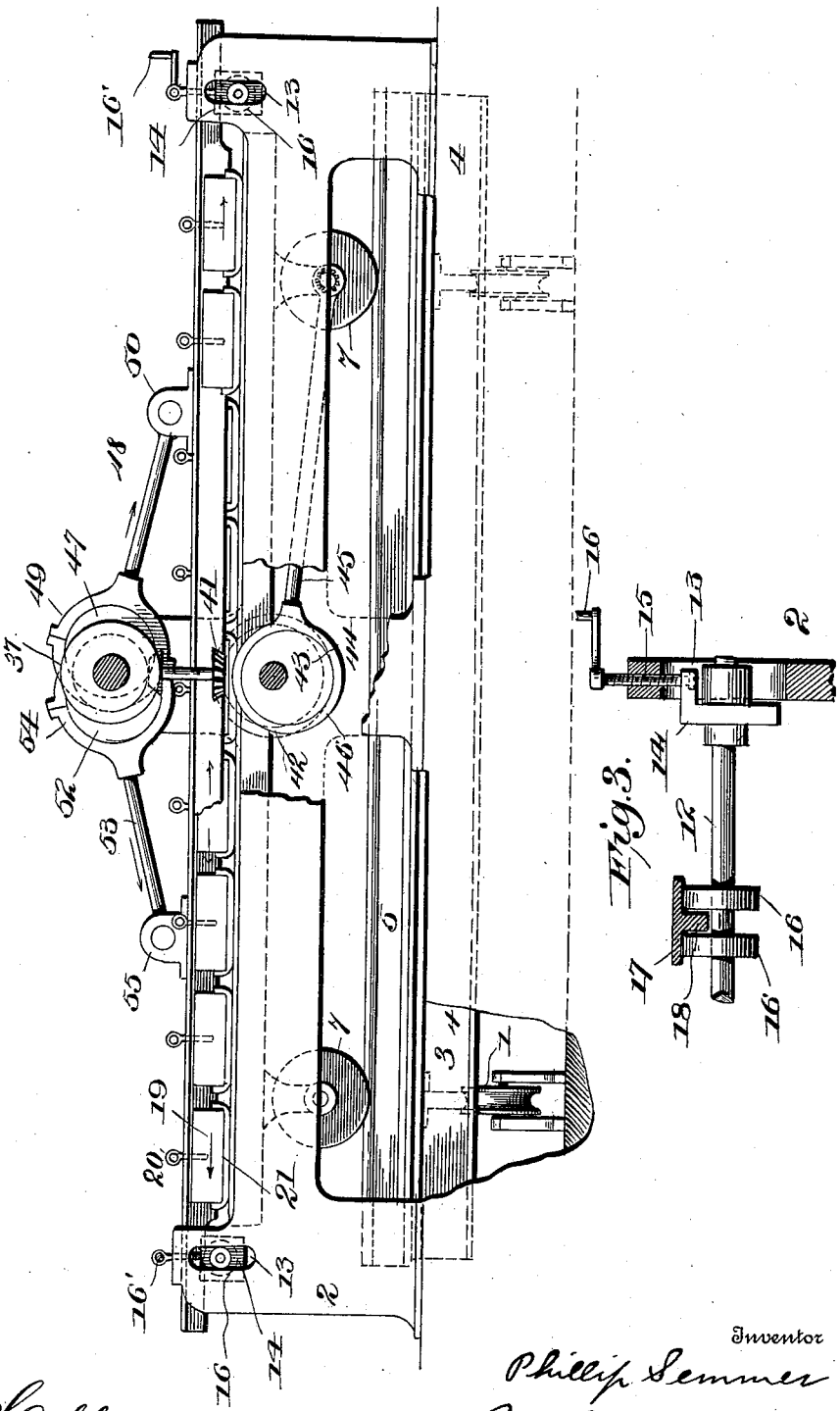

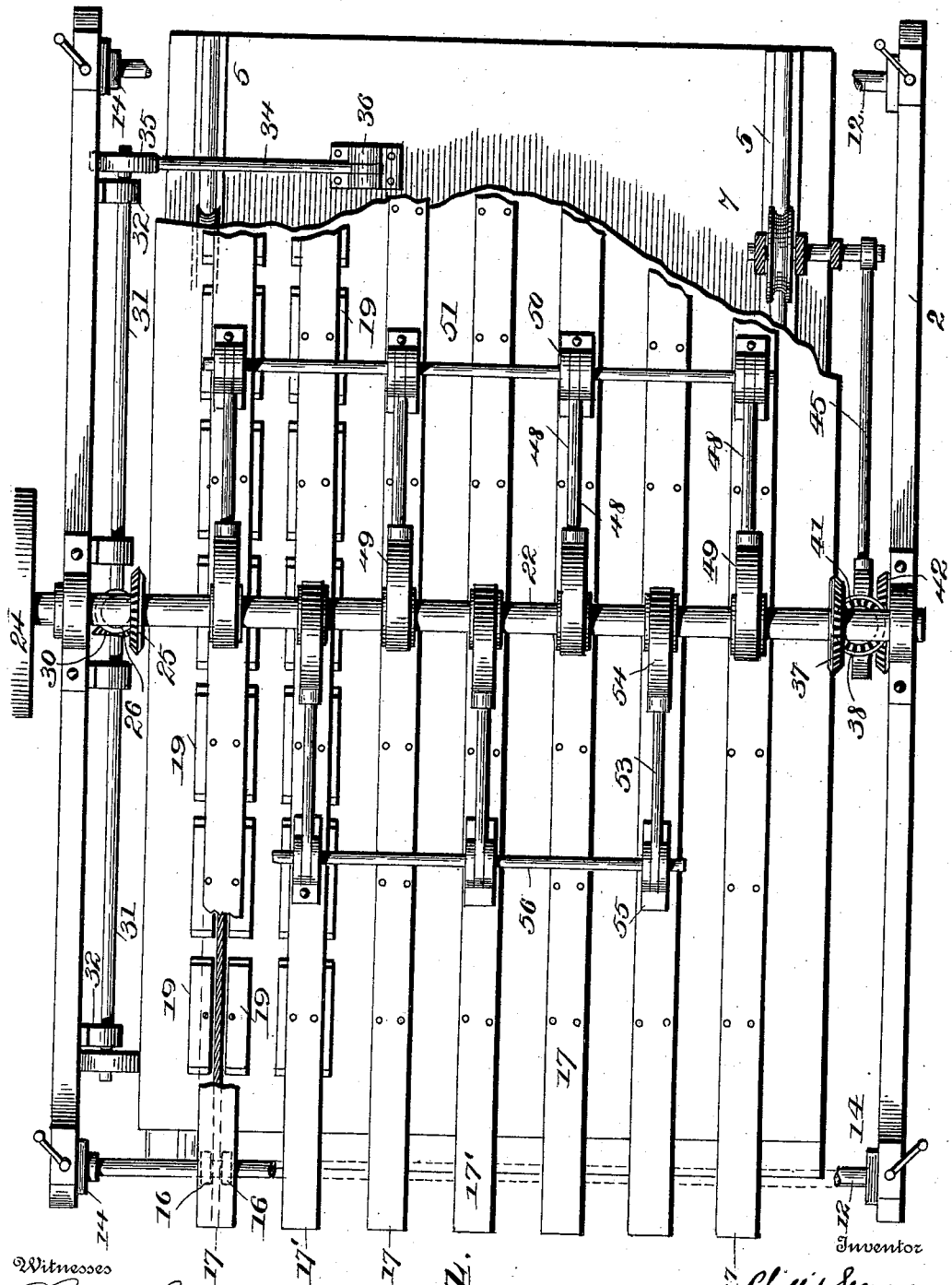

UNITED STATES PATENT OFFICE.

PHILLIP SEMMER, OF PITTSBURG, PENNSYLVANIA.

GLASS-POLISHING MACHINE.

SPECIFICATION forming part of Letters Patent No. 613,532, dated November 1, 1898.

Application filed November 19, 1897. Serial No. 659,117. (No model.)

*To all whom it may concern:*

Be it known that I, PHILLIP SEMMER, a citizen of the United States, residing at Pittsburg, in the county of Allegheny and State of Pennsylvania, have invented certain new and useful Improvements in Glass-Polishing Machines; and I do hereby declare the following to be a full, clear, and exact description of the invention, such as will enable others skilled in the art to which it appertains to make and use the same.

My invention has relation to machines for grinding and polishing sheets of plain glass and other plain surfaces; and it consists in the novel construction and arrangement of its parts, as hereinafter described.

The object of the invention is to provide a machine having a number of reciprocating polishing-blocks, said blocks being arranged in rows, the adjacent rows of blocks reciprocating in opposite directions—that is, each alternate row reciprocates simultaneously in the same direction. The blocks are adapted to reciprocate on the upper surface of the sheet of glass or other plain surface. The plate of glass or other plain surface rests upon a table, said table having a substantially circular or elliptical horizontal movement, the plate of glass moving with the table, and thus the polishing-blocks give the upper surface a thorough circular or elliptical scrub in addition to the reciprocation of the blocks themselves. The adjacent rows of blocks reciprocating in the opposite directions neutralize the force of each other, and thus the frictional contact between the blocks and the surface being treated will not cause or have a tendency to cause the said surface to move irrespective of the movement of the table.

A further object of the invention is to provide an easy and ready means for elevating the blocks, thus lifting them off of the surface being treated and thus permitting the surface to be removed from the table.

In the accompanying drawings, Figure 1 is an end elevation of the machine, partly in section. Fig. 2 is a side elevation, partly in section. Fig. 3 is a sectional view of one of the corners of the framework of the machine; and Fig. 4 is a top plan view of the machine, with portions of some of the parts removed.

The rollers 1 1 are mounted under the framework 2, the said rollers 1 1 having their bearings resting upon solid foundations. The said rollers are arranged in alinement in sets, two or more composing a set. The peripheries of the rollers 1 1 are concaved, as shown in Fig. 2, and the cross-beams 3 rest on the upper portions of the said rollers. The cross-beams 3 are connected at their ends by the beams 4, and thus the beams 3 and 4 form a framework upon which are mounted the rails 5 5. The table 6 is provided on its under side with the flanged wheels 7 7, said wheels being adapted to run on the rails 5 5. The under side of the table is also provided with a webbing 8, said webbing being adapted to brace the table and prevent any tendency to sag at the center. A steam-passage is located under the upper surface of the table 6, said passage having its inlet at 9 and its outlet at 10, as shown in Fig. 1, and by means of the introduction of steam or hot water into said passage the upper surface of the table is maintained at an even high temperature. This temperature is transmitted to the sheet of glass 11, said sheet resting flat upon the upper surface of the table 6. The horizontal rods 12 12 are located one at each end of the framework of the machine 2, the ends of said rods passing through the openings 13, and the hanger 14 is located at each end of each rod 12, said hanger 14 being swiveled to the lower end of the threaded bolt 15, said bolt passing perpendicularly through a threaded perforation in the framework 2 and having at its upper end a suitable handle 16, by means of which the said bolt 15 may be revolved and the hangers 14 and rods 12 lowered or elevated.

At suitable intervals the rollers 16 are mounted on the rods 12, the said rollers 16 being arranged in pairs, there being a slight space between the faces of the rollers forming a pair. The T-beams 17 rest at their ends upon the upper portions of the rollers 16, the central downward-extending section 18 of the T-beam passing between the rollers 16, forming a set. Thus it will be seen that as the rod 12 is lowered or lifted the T-beams 17 will also be lowered or lifted. Each T-beam 17 is provided at regular intervals with a number of polishing-blocks 19, said blocks being secured to the beams by means of the bolts 20, which pass through suitable perforations of the beams and enter the blocks. The lower side of each block 19 is provided with a felt or other polishing material 21. A horizontal shaft 22 is journaled at its ends in the framework 2 of the machine, said shaft 22 extending transversely across the machine and being elevated above the table 6. The shaft is revolved by any suitable power transmitted through a belt 23 to the pulley 24. As shown in Fig. 1, the shaft 22 is provided near the right-hand end with a bevel gear-wheel 25, said gear-wheel meshing with the horizontal gear 26, the said gear 26 being fixed to the upper end of the perpendicular shaft 27, said shaft being journaled in bearings, the bearings 28 in turn being supported by the frame 2.

The lower end of the shaft 27 is provided with a bevel-gear 29, the said gear meshing with the bevel-gear 30, the bevel-gear 30 being fixed to the horizontal shaft 31. The shaft 31 is journaled on the bearings 32, the said bearings in turn being attached to and supported by the frame 2. At either or both ends or at an intermediate point the said shaft 31 is provided with the eccentrics 33. The pitmen 34 are provided at one end with the rings 35, said rings surrounding the eccentrics 33, as shown in Fig. 1. The inner ends of the pitmen 34 are journaled on the bearings 36, ball-bearings, as indicated in Fig. 1, being used, if desired. The bearings 36 are mounted on the cross-beams 3. Thus it will be seen that as the shaft 22 is revolved a revolving motion is transmitted through the bevel-gear 25 and bevel-gear 26 to the shaft 27, and through the bevel-gears 29 and 30 a revolving motion is transmitted to the shaft 31 and with the eccentric 33 will transmit a reciprocating motion through the pitman 34 to the cross-beams 3.

As shown in Fig. 1, the bevel-gear 37 is attached to the shaft 22 near the left-hand end thereof. Said gear 37 meshes with the gear 38, the gear 38 being fixed to the upper end of the perpendicular shaft 39, the shaft 39 being journaled in the bearing 40, said bearing 40 being attached to and supported by the frame 2 of the machine. The bevel-gear 41 is attached to the lower end of the shaft 39. The bevel-gear 41 meshes with the bevel-gear 42. The gear 42 is fixed to the shaft 43, the said shaft 43 being journaled on the framework 2 of the machine. An eccentric 44 is attached to the shaft 43 and a pitman 45, provided at its upper end with a ring 46. The said ring 46 surrounds the eccentric 44, as shown in Fig. 2. The lower end of the pitman 45 is journaled to the axle of one of the wheels 7, as shown in Fig. 2, ball-bearings being employed, if so desired. Thus it will be seen that as the shaft 22 is revolved a revolving motion is transmitted through the bevel-gears 37 and 38 to the shaft 39 and through the bevel-gears 41 and 42 to the shaft 43, and through the eccentric 44 and pitman 45 a reciprocating motion is given longitudinally to the table 6. This longitudinal motion, in addition to the lateral reciprocating motion imparted by the movement of the framework 3 and 4, gives the table 6 a circular or elliptical movement. The eccentrics 47 47 are fixed to the shaft 22. The pitmen 48 48 are provided at their upper ends with the rings 49, said rings surrounding the eccentrics 47. The lower ends of the pitmen 48 are journaled on the bearings 50, the said bearings being attached to the upper surfaces of the T-rails 17, as shown in Fig. 4. The horizontal rod 51 connects all of the bearings 50, and thus retains the T-rails 17 17 at the proper distance apart.

By referring to Fig. 4 it will be observed that all of the T-rails 17 reciprocate together, while the T-rails 17' also reciprocate together, but in the opposite direction from the T-rails 17. The eccentrics 52 are also attached to the shaft 22, the eccentrics 52 protruding from the said shaft 22 in the opposite direction from the eccentrics 47. The pitmen 53 are provided at their upper ends with the rings 54, the said rings 54 surrounding the eccentrics 52. The lower ends of the pitmen 53 are journaled in the bearings 55, said bearings in turn being attached to the upper faces of the T-beams 17'. The horizontal rod 56 connects all of the bearings 55, and thus retains the T-beams 17' at proper distances apart.

The machine is operated as follows: The bolts 15 15 are turned, and thus the rods 12 12 at each end of the machine are elevated, and the T-beams 17 17, together with their attachments, are also elevated. The sheet of glass or other plain surface 11 is then slipped on the upper surface of the table 6, and when in proper position the horizontal rods 12 12 are lowered until the polishing-blocks 19 rest upon the upper surface of the sheet 11. The shaft 22 is then caused to revolve, and the table 6 is given a circular or elliptical motion, as above described. At the same time the cams 47, revolving, impart to the pitmen 48 a reciprocating motion, and through the said pitmen the T-beams 17 are caused to reciprocate over the upper surface of the sheet 11. At the same time the cams 52, revolving, impart to the pitmen 53 a reciprocating motion, and this motion is transmitted to the T-beams 17'. In view of the fact that the cams 47 protrude in the opposite direction from the cams 52 it is obvious that the T-beams 17 will reciprocate oppositely to the T-beams 17'. A suitable abrasive may be placed upon the upper surface of the plate. The said abrasive will be taken up by the polishing-blocks, and thus the upper surface of the sheet 11 will be thoroughly polished. In some instances in order to put a fine polish upon a sheet it is desirable to maintain the sheet at a high temperature. This can be done by introducing steam or hot water into the passages under the upper surface of the table through the inlet 9 and leading such heating element out through the outlet 10.

Having thus described my invention, what I claim as new, and desire to secure by Letters Patent, is—

1. A grinding and polishing machine consisting of a movable table, a sheet adapted to be located on the upper surface of the table, polishing-blocks located above said table, said blocks being arranged in rows, the said blocks being adapted to come in contact with the upper surface of the sheet, the adjacent rows adapted to reciprocate in opposite directions and thereby neutralizing the lateral forces and preventing the displacement of the sheet.

2. A grinding and polishing machine consisting of a table having a circular or elliptical movement, a sheet adapted to be located on the upper surface of the table, reciprocating blocks located above said table, said blocks being adapted to come in contact with the upper surface of the sheet, said blocks being arranged in rows, the adjacent rows reciprocating in opposite directions thereby neutralizing the lateral forces and preventing the displacement of the sheet.

3. A grinding and polishing machine consisting of a table, wheels carried by said table, a frame located under the table, said frame having a track, the wheels of the table resting on said track, pulleys supporting the frame, a means for imparting a reciprocating motion to the frame, a means for imparting a reciprocating motion to the table, said frame and table reciprocating simultaneously and thereby giving the table a circular or elliptical movement, said table being adapted to carry a sheet, suitable polishing-blocks located above said table.

4. A grinding and polishing machine consisting of a table adapted to support the sheet, reciprocating blocks located above the table, beams carrying said blocks, suitable means for reciprocating the beams, horizontal rods located at the ends of the machine, friction-rollers located on said rods, the ends of the beams resting on said friction-rollers.

5. A grinding and polishing machine consisting of a table, adapted to support the sheet, polishing-blocks located above said table, beams adapted to reciprocate and carry said blocks, suitable means for reciprocating the beams, each beam having a downward-extending central webbing, horizontal rods located at the ends of the machine, friction-rollers located on said rods, said rollers being arranged in pairs, each beam adapted to rest at each end of one pair of rollers, the downward-extending webbing of the beam passing between the rollers constituting a pair.

6. A grinding and polishing machine consisting of a table adapted to carry a sheet, polishing-blocks located above said table, beams carrying said blocks, a means for reciprocating the beams, horizontal rods located at the ends of the table and passing under the ends of the beams, a means for elevating or lowering said rods and thus elevating or lowering the beams.

In testimony whereof I affix my signature in presence of two witnesses.

PHILLIP SEMMER.

Witnesses:
CHAS. W. ASHLEY,
SAMUEL G. BAILEY.